(12) United States Patent
Goel et al.

(10) Patent No.: US 8,775,514 B2
(45) Date of Patent: Jul. 8, 2014

(54) SYSTEM AND METHOD FOR PROVIDING INSTANT COMMUNICATION BASED CUSTOMER SUPPORT SERVICES USING VOICE RECOGNITION

(75) Inventors: Nikhil Goel, Irving, TX (US); Bipin Sakamuri, Irving, TX (US); Amit Singh, Irving, TX (US); Dinyar Kavouspour, Plano, TX (US); Fari Ebrahimi, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 779 days.

(21) Appl. No.: 12/483,067

(22) Filed: Jun. 11, 2009

(65) Prior Publication Data

US 2010/0316213 A1 Dec. 16, 2010

(51) Int. Cl.
*G06F 15/16* (2006.01)
*G10L 15/00* (2013.01)
*H04M 3/42* (2006.01)

(52) U.S. Cl.
CPC ............ *G10L 15/00* (2013.01); *H04M 3/42365* (2013.01)
USPC .... 709/204; 709/206; 379/88.17; 379/265.09

(58) Field of Classification Search
CPC ....................................................... H04M 3/523
USPC .................. 379/265.09; 709/206; 704/4, 204
See application file for complete search history.

(56) References Cited

U.S. PATENT DOCUMENTS

| | | | |
|---|---|---|---|
| 6,385,306 B1 * | 5/2002 | Baxter, Jr. .................. | 379/88.13 |
| 8,019,815 B2 * | 9/2011 | Keener et al. ................. | 709/204 |
| 8,060,565 B1 * | 11/2011 | Swartz .......................... | 709/206 |
| 2002/0090062 A1 * | 7/2002 | Mohamed Alhadad et al. ........................... | 379/67.1 |
| 2004/0107239 A1 * | 6/2004 | Hasegawa et al. ............ | 709/200 |
| 2005/0187781 A1 * | 8/2005 | Christensen ...................... | 705/1 |
| 2008/0255837 A1 * | 10/2008 | Kahn et al. .................... | 704/235 |
| 2009/0019377 A1 * | 1/2009 | Chen et al. .................... | 715/758 |
| 2010/0091960 A1 * | 4/2010 | Ervin et al. ................. | 379/88.18 |
| 2010/0257512 A1 * | 10/2010 | Ortscheid ...................... | 717/131 |
| 2012/0069975 A1 * | 3/2012 | Odinak et al. ............. | 379/88.14 |

* cited by examiner

*Primary Examiner* — Creighton Smith (57) ABSTRACT

An approach is provided for managed instant communication (or chat)-based customer support services. Data communication is received, at a customer service platform, from a customer requesting assistance. An instant communication session is established between the customer and an agent at the customer service platform. Speech-to-text conversion operation is activated for the agent, wherein the agent corresponds during the instant communication session by speech. Agent speech correspondence is converted during the instant communication session to text data. Agent correspondence is transmitted to the customer as text data.

20 Claims, 7 Drawing Sheets

SYSTEM AND METHOD FOR PROVIDING INSTANT COMMUNICATION BASED CUSTOMER SUPPORT SERVICES USING VOICE RECOGNITION

BACKGROUND INFORMATION

With the advent of computers, interactive electronic communications, and the Internet, as well as advances in the realm of digital information, has come a reinvention of conventional techniques for customer support. Traditionally, customer support services have been facilitated through telephony call centers, whereby participants converse via voice communications in order to resolve customer issues. Unfortunately, these conventional approaches have proven to be inefficient and expensive, as they are typically constrained by legacy infrastructures and corresponding technologies. With readily available, cost-effective broadband services and reductions in cost of computing equipment, mobile devices, and the like, new more advanced techniques for customer support services are desired.

Furthermore, telecommunication service providers are finding it increasingly more challenging to leverage their existing resources. Yet, as increasing numbers of individuals migrate from the use of traditional communications based technologies to synergistic multimedia platforms, traditional telecommunications service providers are being challenged to develop new services and features in order to remain competitive, as well as develop fresh sources of revenue to support their aging infrastructures.

Therefore, there is a need for an approach that provides effective and convenient techniques for managed instant communication based customer support services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing managed instant communication based customer support services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to instant communication (or chat) based applications, it is contemplated that exemplary embodiments have applicability to other equivalent applications.

Figure 1:
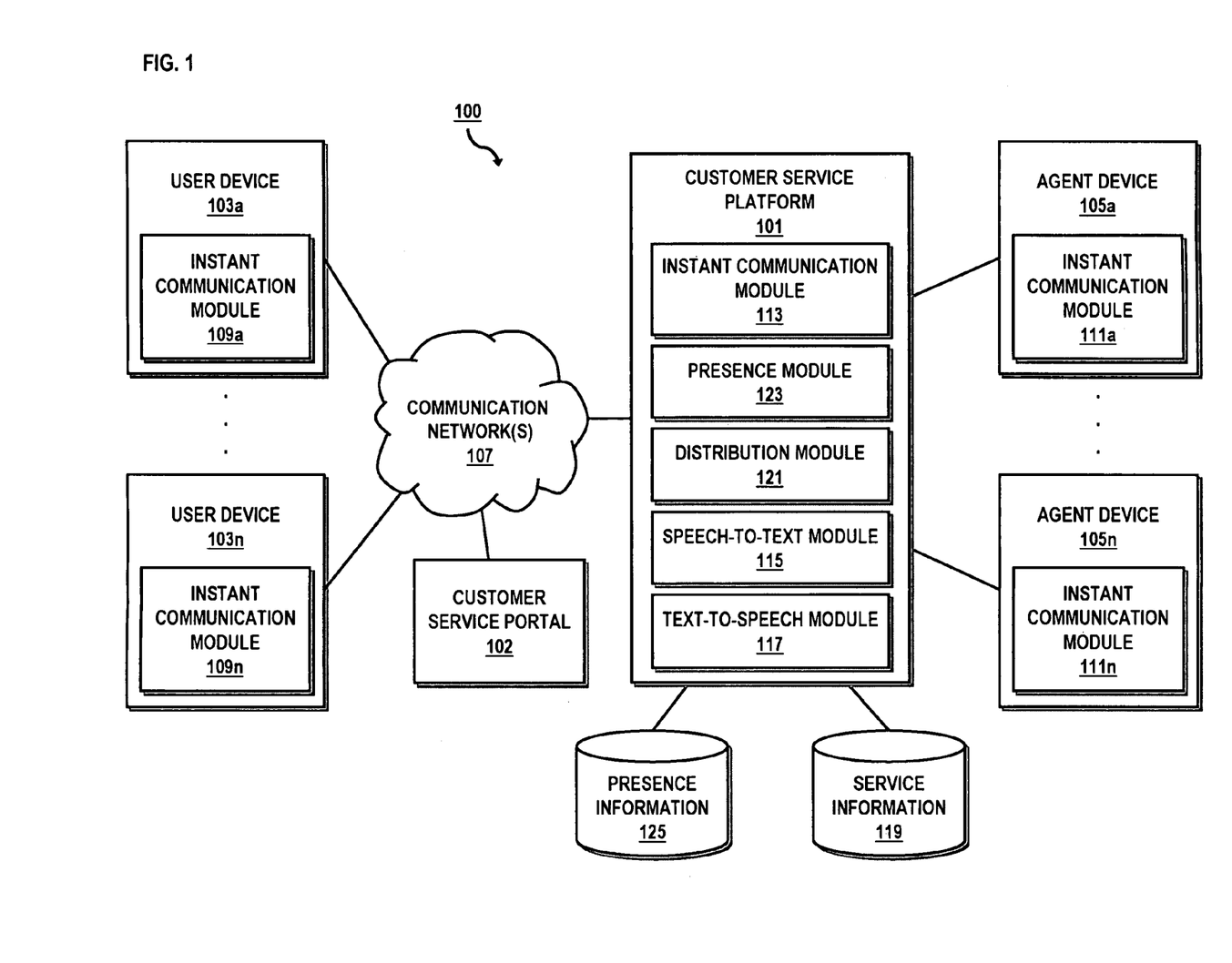
FIG. 1 is a diagram of a system capable of providing managed instant communication (or chat)-based customer support services, according to an exemplary embodiment.

FIG. 1 is a diagram of a system capable of providing managed instant communication based customer support services, according to an exemplary embodiment. For the purpose of illustration, system 100 is described with respect to customer service platform (or platform) 101 configured to receive one or more data communications from one or more users (or customers), at one or more user devices 103a-103n, requesting assistance and to establish one or more instant communication (or chat)-based sessions between the one or more customers and one or more customer service agents (or agents), at one or more agent devices 105a-105n, for providing managed instant communication based customer support services. It is noted that platform 101 may distribute the one or more instant communication sessions to the one or more agents based on, for example, presence information associated with the agents. To this end, platform 101 is configured to facilitate the one or more instant communication-based sessions over one or more communication networks 107. In exemplary embodiments, platform 101 is further configured to support speech-to-text and/or text-to-speech conversion and, thereby, configured to seamlessly integrate and toggle between speech-based and chat-based communication so that participants can communicate using one or more of speech-based and chat-based technologies. According to one embodiment, a customer service portal 102 is provided for a user (e.g., customer) to interface with the customer service platform 101; such portal 102 can be in form of a website accessible via a browser application, for instance. Platform 101 may also enable participants to exchange (e.g., upload, download, transfer, etc.) information, such as data files (e.g., audio, image, text, and/or video) via the one or more instant communication sessions, as well as store one or more records of data (e.g., correspondence, exchanged information, etc.) between participants of the one or more instant communication sessions. The one or more records may be time stamped, tracked, received, retrieved, and the like. As such, user devices 103a-103n and agent devices 105a-105n may be equipped with respective instant communication modules 109a-109n and 111a-111n for executing one or more instant communication, messaging, or chat-based applications (or clients) for corresponding via established instant communication based customer support sessions. While specific reference will be made hereto, it is contemplated that system 100 may embody many forms and include multiple and/or alternative components and facilities.

It is recognized that providing high quality customer support is an integral part of many businesses, organizations, institutions, and the like (hereinafter collectively referred to as enterprises), that provide services, products, and information to various sectors (or markets), such as educational markets, production markets, supply markets, maintenance markets, financial markets, and the like. Typically, these enterprises go to great efforts trying to differentiate themselves, or otherwise gain competitive advantages and unusually on the basis of customer support service alone. To this end, an enterprise will typically exhaust significant amounts of capital in efforts to provide increasingly higher levels of customer support service, such as is in the case of customer support service call centers. Namely, enterprises have traditionally sunk enormous amounts of money into legacy telephony systems in order to address customer needs via, for example, provisioning toll-free customer service telephone numbers for call centers so that customers can reach customer service representatives (or agents) when needed.

The convergence of legacy telephony and data communications within the telecommunications arena has enabled enterprises to realize certain cost-effective means for reaching customers, such as extending customer support service via a variety of modes of communication, such as, for example, electronic mail, telephony calls, self-service portals, web pages, and the like. With the increasing popularity of instant communication, messaging, or chat-based applications, enterprises are beginning to seriously consider the potential advantages associated with the provisioning of chat-based customer support services. Even though chat-based messaging is more or less "instant," the processing time for a customer service agent to address a problem (or inquiry) and then formulate a response remains lengthy. Namely, the advantages of chat-based sessions are, often times, offset by the associated burdens of having to type drawn out, extended responses. Thus, as the processing time increases, so too does the rather significant negative repercussions in customer satisfaction.

Accordingly, the described issues further exemplify other prevailing concerns, such as that legacy telephony-based customer support systems only permit voice as the sole input/output medium. In this manner, when attempting to exchange information during a voice communication session, participants must either verbally convey the information or else be prevented from sharing the data. Along these lines, telephony communications do not lend themselves to cost-effective storage and archiving techniques. To achieve advances in operations maintenance, it can be critical for customer support sessions to be captured, stored, and made available for searching and later utilization for, for instance, training new customer service agents or generating batched responses to frequently occurring issues. Moreover, customer support services extended via legacy infrastructures tend to provide one of the more expensive modes of communication. That is, substantial costs are associated with owning, operating and maintaining dedicated telephony bridges for customer support services and, as such, enterprises are generally limited to restricted numbers of dedicated bridges. Still further, customer service support agents are practically unable to multi-task even though these individuals may be idle for extended periods of time while, for instance, service information queries are formulated, etc. Hence, legacy customer support systems utilizing voice-based communications alone do not effectively utilize agent capabilities and, as a result, cause overstaffing and unnecessary cost expenditures.

It is noted that instant communication-based customer support services are becoming more appealing to both customers and enterprises alike, largely due to the fact that chat-based sessions (and supporting infrastructures) are significantly less expensive for both parties as compared to corresponding telephony-based services. Even more so, customers tend to perceive the availability of instant communications as more effective. Namely, customers generally feel as though they are able to access customer service support agents more quickly. In spite of these advantages, telephony-based customer support services still predominate as it is much easier to converse via, for example, a telephony device than to, for instance, type a series of long, extended text messages.

Therefore, the approach of system 100, according to certain exemplary embodiments, stems from the recognition that extending instant communication (or chat)-based customer support services that integrate both speech-based and chat-based communications can improve the manner in which customer support services are managed and operated, as well as reduce upon the costs associated with these customer support services. In this manner, the nature of instant communications lends itself to efficient, cost-effective storage and retrieval. Furthermore, the vast resources of existing infrastructures, such as the Internet, makes data communication channels unlimited, at least for all practical intensive purposes. As such, instant communication, messaging, or chat-based sessions may be allocated on-demand at a fraction of the cost when compared with customer support sessions extending over legacy infrastructures via dedicated telephony bridges. Moreover, instant communication sessions can be monitored in an automated manner that enables customer support service agents to multitask.

According to exemplary embodiments, customer service platform 101 (via, for example, instant communication module 113) is configured to establish and/or support one or more instant communication-based sessions between one or more users (or customers) and one or more customer service agents (or agents) for providing customers and enterprises alike with managed instant communication-based customer support services. In this manner, instant communication module 113 is configured to process data communications, such as text messages, between endpoints of system 100, such as user devices 103*a*-103*n* and agent devices 105*a*-105*n*. With the aid of speech-to-text module 115 and text-to-speech module 117, instant communication session module 113 may further convert between speech-based and chat-based modes of communication, as well as enable participants (e.g., agents) to review and modify communications before transmitting them to the correspondingly other participants (e.g., customers). Thus, in exemplary embodiments, speech-to-text module 115 and text-to-speech module 117 may capture corresponding voice and/or text correspondence so that converted correspondences may be presented (e.g., displayed) in one or more instant communication-based sessions. For example, when an agent via, for instance, agent device 105*a* provides one or more utterances as input to instant communication module 111*a*, the speech may be converted to text data, such that the text data may displayed to participants of the chat-based customer support session as text data. In other instances, an agent via, for instance, agent device 105*n* may provide one or more textual inputs to instant communication module 111*n*, such that input text data is converted to speech correspondence by, for example, text-to-speech module 117 and, thereby, presented to a corresponding customer at, for instance, user device 103*n* that, in this example, has telephony capabilities.

In various exemplary embodiments, instant communication module 113, as well as instant communication modules 109*a*-109*n* and 111*a*-111*n*, may employ one or more instant communication (or chat) client protocols, such as an extensible messaging and presence protocol (XMPP), a session initiating protocol (SIP), a session initiation protocol for instant messaging and presence leveraging extensions (SIMPLE), and/or any other suitable protocol, for establishing, maintaining, and/or supporting corresponding channels for instant communication based customer support sessions.

To enhance user and agent experiences, instant communication module 113 may also facilitate the exchange (e.g., uploading, downloading, modifying, customizing, etc.) of various forms of customer support (or service) information. For example, instant communication module 113 may provide one or more graphical user interfaces (GUI) to enable participants at user devices 103a-103n and agent devices 105a-105n to access, input, update, and/or maintain one or more user profiles that specify, for example, information corresponding to buddy names, passwords, internet protocol addresses, electronic mail addresses, geographical assignments, schedules (start time, stop time, breaks, etc.), skills, technological capabilities, etc. This "user profile" information may be stored to service information repository 119 or any other suitable storage location or memory of (or accessible to) system 100. It is contemplated, however, that the features or functionalities of instant communication module 113 may be shared and/or distributed amongst corresponding instant communication modules 109a-109n and 111a-111n associated with respective user devices 103a-103n and agent devices 105a-105n.

According to various exemplary embodiments, established instant communication based customer support sessions may be distributed by platform 101 (via, for example, distribution module 121) to one or more customer support agents at, for example, one or more agent devices 105a-105n. Distribution of these instant communication-based sessions may be based on, for example, presence information associated with the agents. As such, platform 101 may also include (or have access to) presence module 123 and/or presence information repository 125 for determining availabilities of a plurality of agents based on, for example, presence information associated with the plurality of agents. In exemplary embodiments, presence module 123 may be configured to generate and/or collect presence information from participants, as well as store such presence information at presence information repository 125 or any other suitable storage location or memory of (or available to) system 100.

Presence information may related to one or more parameters, such as one or more geographies, customer support issues being "currently" addressed, workload rotations (e.g., schedule for distributing instant communication sessions to agents in one or more predefined patterns, etc.), schedules (start time, stop time, breaks, etc.), skills, technological capabilities of corresponding agent devices, and general workload (e.g., past, present, and/or future), as well as any other suitable presence parameter. It is noted that one or more of these forms of presence information may be defined as "rich" presence information, which is an enhanced form of presence awareness in which participants can determine if other users are online and if so, observe to a limited extent what activities the participants are engaged in and how they are performing the activities. Basic presence services divulge only the availability of another user. By contrast, rich presence provides greater information, whereby users can let others know any other suitable form of information beyond conventional presence information. An exemplary model for presence and presence determination are respectively detailed in Internet Engineering Task Force (IETF) Request for Comments (RFC) 2778 and 2779, which are incorporated herein, by reference, in their entireties. An exemplary data format for conveying presence information, as well as extensions to that format for conveying rich presence information, are respectively detailed in IETF RFCs 3863 and 4480, which are incorporated herein, by reference, in their entireties.

Accordingly, presence information may be retrieved or ported to distribution module 121 for determining availabilities and, thus, utilizing those availabilities for distributing established instant communication sessions to appropriate customer service agents. Because of the immediate or instant nature of the communication, instant communication module 113 may also utilize presence information or availability of participants for facilitating the exchange of information over "active" instant communication sessions. Thus, user devices 103a-103n, via instant communication modules 109a-109n, and agent devices 105a-105n, via instant communication modules 111a-111n, and/or one or more contact (or "buddy") lists, may transmit and view presence information (e.g., presence messages) over one or more of communication networks 107 to indicate and perceive one or more availability states (e.g., online, away, etc.) of user devices 103a-103n and/or agent devices 105a-105n and, thereby, of the participants.

Platform 101, via instant communication session module 113, may also enable customers and agents to exchange (e.g., upload, download, customize, etc.) information, such as data files (e.g., audio data, image data, text data, and/or video data) via instant communication based sessions, as well as monitor and store a record of data transmitted during an instant communication session. Records may be stored to, for example, service information repository 119. These records may be tracked, time stamped, retrieved, and/or utilized to facilitate queries for such records or customer support issues resolved within such records. It is contemplated that service information may further include one or more help files, customer support navigation trees, batched responses to recurring customer issues, prompts, customer support knowledge base files (or links thereto), and/or any other equivalent, suitable, and/or conventional customer support information. Again, these various forms of service information may be stored to service information repository 119 or any other suitable storage location or memory of (or accessible to) system 100.

To this end, platform 101 is configured to facilitate managed instant communication-based customer support services over one or more communication networks 107. It is noted that communication networks 107 may be any suitable wireline, wireless, or combination thereof network. For example, communication networks 107 may include one or more telephony networks, such as a circuit-switched network, e.g., the public switched telephone network (PSTN), an integrated services digital network (ISDN), a private branch exchange (PBX), or other like network. Communication networks 105 may employ various wireless access technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. In other instances, communication networks may include a data network, such as any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network. It is further contemplated that communication networks 107 may include components and facilities to provide for signaling and/or bearer communications between the various components or facilities of system 100. In this manner, communication networks 107 may embody or include portions of a signaling system 7 (SS7) network, or other suitable infrastructure to support control and signaling functions.

Accordingly, user devices 103a-103n and agent devices 105a-105n may include any customer premise equipment (CPE) capable of sending and/or receiving one or more forms of the aforementioned modes of communication (e.g., chat-based communications, voice communications, etc.), as well as send and receive information (e.g., customer service information and/or data files) over one or more of communication networks 107. For instance, devices 103a-103n and 105a-105n may include functionality for telephony-based communications, such as those functions employed by suitable plain old telephone service (POTS) devices, facsimile machines, and the like. Devices 103a-103n and 105a-105n may employ mobile (or otherwise wireless) functions, such as included in cellular phones, radiophones, satellite phones, smart phones, wireless phones, or any other suitable mobile device, such as personal digital assistants (PDA), pocket personal computers, tablets, customized hardware, etc. Further, devices 103a-103n and 105a-105n may include computing devices functions, such as implemented by any suitable computing device, e.g., VoIP phones, skinny client control protocol (SCCP) phones, session initiation protocol (SIP) phones, IP phones, personal computers, softphones, workstations, terminals, servers, and the like.

It is noted that user devices 103a-103n and agent devices 105a-105n may include one or more components for extending instant communications sessions to participants, as well as include one or more components for enabling speech input and/or output. In this manner, devices 103a-103n and 105a-105n include respective instant communication modules 109a-109n and 111a-111n and/or any other suitable client programs that operate thereon for providing access to the various services of system 100, such as providing access to the managed instant communication based customer support services of platform 101. As previously mentioned, it is contemplated that instant communication modules 109a-109n and 111a-111n (or the other client programs) may be executed via platform 101 (e.g., via instant communication module 113) and, thereby, made accessible to participants via devices 103a-103n and 105a-105n. In this way, instant communication modules 109a-109n and 111a-111n may provide one or more user interfaces, e.g., graphical user interfaces (GUI), configured to interact with the various services (or functions) of system 100. An exemplary GUI is described in more detail in accordance with FIG. 5. Additionally (or alternatively), GUI interfaces may be configured to facilitate the acquisitioning, exchanging, managing, sharing, storing, and updating of service information stored to, for example, service information repository 119.

It is further noted that repositories 119 and 125 may be maintained by a service provider of platform 101 or by any suitable third-party. It is also contemplated that the physical implementation of repositories 119 and 125 may take on many forms, including, for example, portions of existing repositories of a service provider, new repositories of a service provider, third-party repositories, and/or shared-repositories. As such, repositories 119 and 125 may be configured for communication over system 100 (e.g., over one or more of communication networks 107) through any suitable messaging protocol, such as lightweight directory access protocol (LDAP), extensible markup language (XML), open database connectivity (ODBC), structured query language (SQL), Configuration Access Protocol (CAP) and the like, as well as combinations thereof. In those instances when repositories 119 and 125 is provided in a distributed fashion, information and content available via repositories 119 and 125 may be located utilizing any suitable querying technique, such as electronic number matching, distributed universal number discovery (DUNDi), uniform resource identifiers (URI), etc.

Various exemplary operations of system 100 for providing managed instant communication-based customer support services are explained below.

Figure 2:
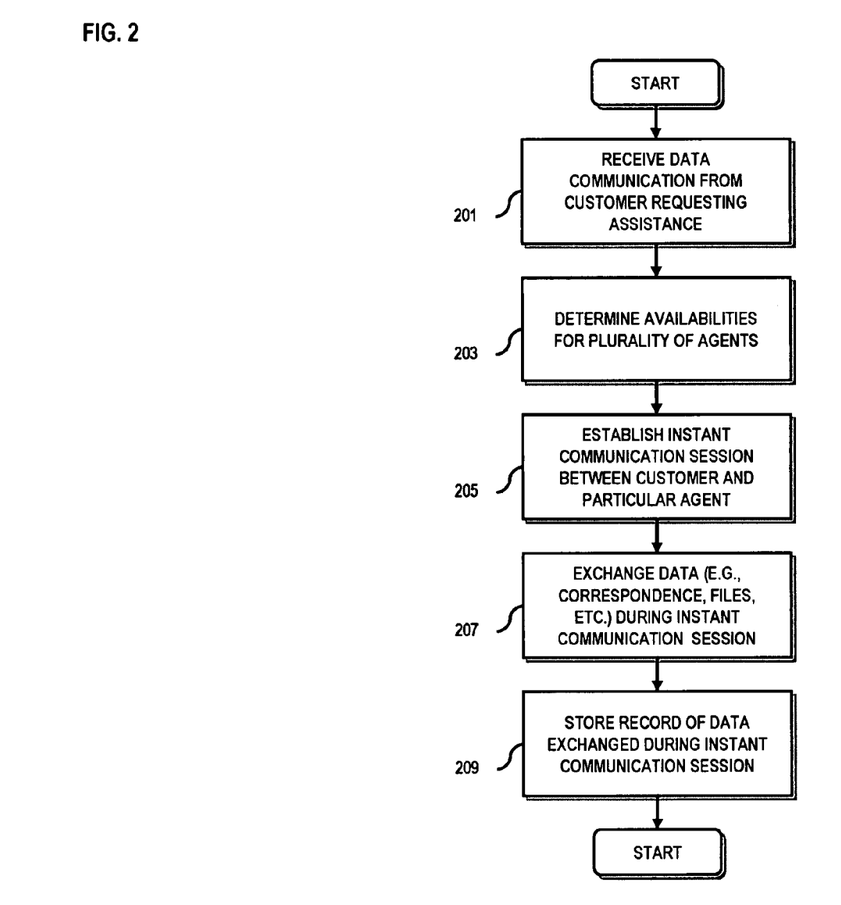
FIG. 2 is a flowchart of a process for providing managed instant communication (or chat)-based customer support services, according to an exemplary embodiment.

FIG. 2 is a flowchart of a process for providing managed instant communication-based customer support services, according to an exemplary embodiment. For illustrative purposes, the process is described with respect to FIG. 1. It is noted that, in this example, the terms "customer" and "customer service agent" refer to corresponding devices that enable customers and customer service agents to participate in instant communication-based customer support sessions. It is also noted that the steps of the process may be performed in any suitable order, as well as combined or separated in any suitable manner.

In step 201, customer service platform 101 receives, via instant communication module 113, data communication (e.g., text message) from a customer requesting assistance. At step 203, presence module 123 determines availabilities for a plurality of customer service agents based on, for example, presence information associated with the plurality of agents. In exemplary embodiments, the presence information may relate to one or more parameters, such as one or more geographies, issues being "currently" addressed, rotations (e.g., route instant communication sessions to customer service agents in a predefined pattern, randomly, etc.), schedules (start time, stop time, breaks, etc.), skills, technological capabilities of corresponding agent devices, and workload (e.g., past, present, and/or future), as well as any other suitable presence parameter, which may be stored to, for instance, presence information repository 125 or any other suitable storage location of (or accessible to) system 100. As such, distribution module 121 may utilize the availabilities to select a particular agent to handle the assistance request. In any event, instant communication module 113 establishes an instant communication session between the customer and a particular agent, per step 205. In step 207, instant communication module 113 facilitates the exchange of data (e.g., participant correspondence, data files, etc.) during the instant communication session over, for example, one or more of communication networks 107. The exchange of participant correspondence is described in more detail in association with FIG. 3, whereas the exchange of data files is described in association with FIG. 4. To create a record of the customer support session that may be utilized by, for example, agents during the instant communication session or reviewed at a later time, such as for training, resuming "earlier" customer support sessions, etc., instant communication module 113 stores (in step 209) a record of data exchanged during the instant communication session to, for instance, service information repository 119 or any other suitable storage location of (or accessible to) system 100.

Figure 3:
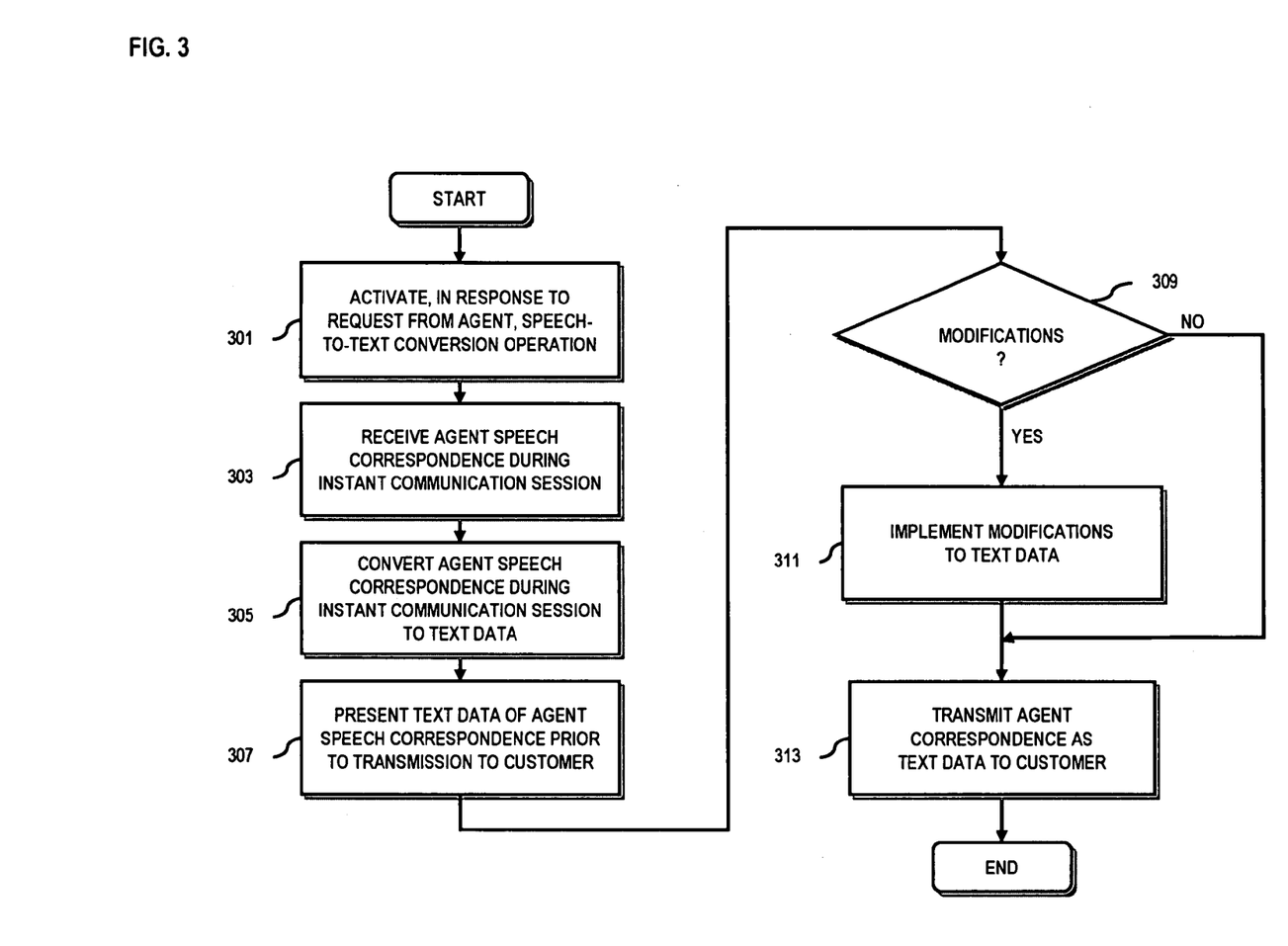
FIG. 3 is a flowchart of a process for transmitting agent correspondence as text data to a customer as part of a managed instant communication (or chat)-based customer support session, according to an exemplary embodiment.

FIG. 3 is a flowchart of a process for transmitting agent correspondence as text data to a customer as part of a managed instant communication-based customer support session, according to an exemplary embodiment. For illustrative purposes, the process is described with respect to FIG. 1. It is noted that the steps of the process may be performed in any suitable order, as well as combined or separated in any suitable manner. Furthermore, it is assumed that an instant communication session has already been established between a customer and an agent. Even though the following process is descried with respect to speech-to-text conversion, the process is also applicable to converse situations, i.e., instances when text-to-speech conversion is executed. Such an alternative scenario may apply to instances when, for example, a customer utilizes a telephony user device (and corresponding speech-based communications) and an agent utilizes a computing agent device (and corresponding text-based communications) for communicating with the "other" respective participant to the instant communication session.

At step 301, instant communication module 113 activates, in response to receiving a request from the agent, speech-to-text module 115 for converting utterances (or speech) of the agent into text data. It is also contemplated that customers may be provided with the features and functionalities of speech-to-text module 115. In step 303, speech-to-text module 115 receives agent speech correspondence during the established instant communication session. Speech-to-text module 115 converts, at step 305, agent speech correspondence during the instant communication session to text data, which may be ported to instant communication module 113. Instant communication module 113, per step 307, presents the text data of the agent speech correspondence to the agent prior to transmission to the customer so as to enable the agent to review and/or modify (e.g., correct speech-to-text conversion errors, add supplementary text, etc.) the text data. At step 309, instant communication module 113 determines whether the agent desires to modify the presented text data, such as, for example, based on one or more additional speech-based or text-based inputs prior to transmission. If one or more modifications are desired, then instant communication module 113 enables the agent to input the one or more modifications, such that instant communication module 113 implements, in step 311, the one or more modifications to the presented text data. Once the one or more modifications are implemented (or the text data is accepted), then instant communication module 113, per step 313, transmits the agent speech correspondence as text data to the customer via the established instant communication-based session.

Figure 4:
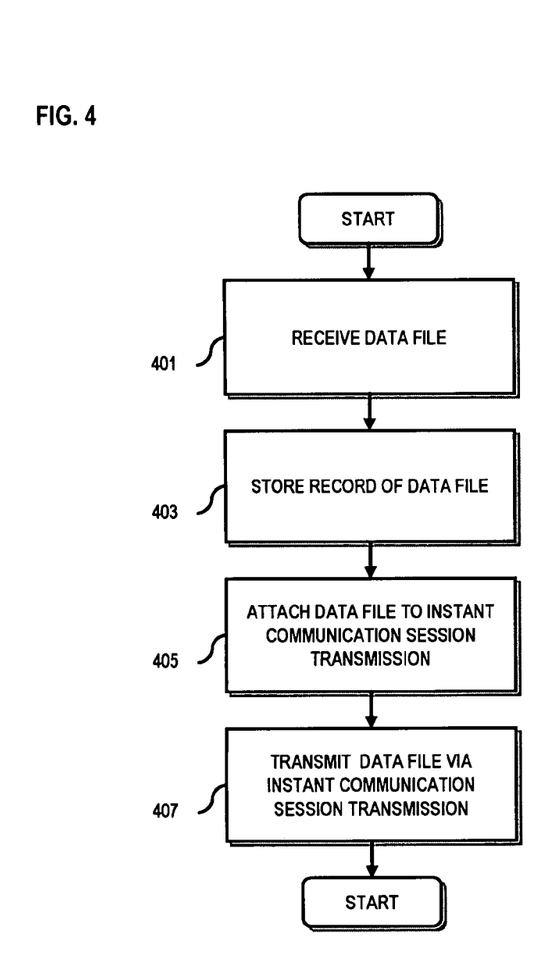
FIG. 4 is a flowchart of a process for exchanging data files via an instant communication (or chat)-based customer support session, according to an exemplary embodiment.

FIG. 4 is a flowchart of a process for exchanging data files via an instant communication-based customer support session, according to an exemplary embodiment. For illustrative purposes, the process is described with respect to FIG. 1. Further, it is assumed that an instant communication session has already been established between a customer and an agent. It is also noted that the steps of the process may be performed in any suitable order, as well as combined or separated in any suitable manner.

In step 401, platform 101 via, for example, instant communication module 113, receives a data file from, for instance, the customer or the agent. As previously mentioned, the data file may relate to audio data, image data, text data, and/or video data. Per step 403, instant communication module 113 stores a record of the data file to, for example, service information repository 119 or any other suitable storage location or memory of (or accessible to) system 100. At step 405, instant communication module 113 attaches the data file to a particular transmission corresponding to the established instant communication session. Accordingly, the data file is transmitted to the agent or the customer, per step 407, via the established instant communication session.

Figure 5:
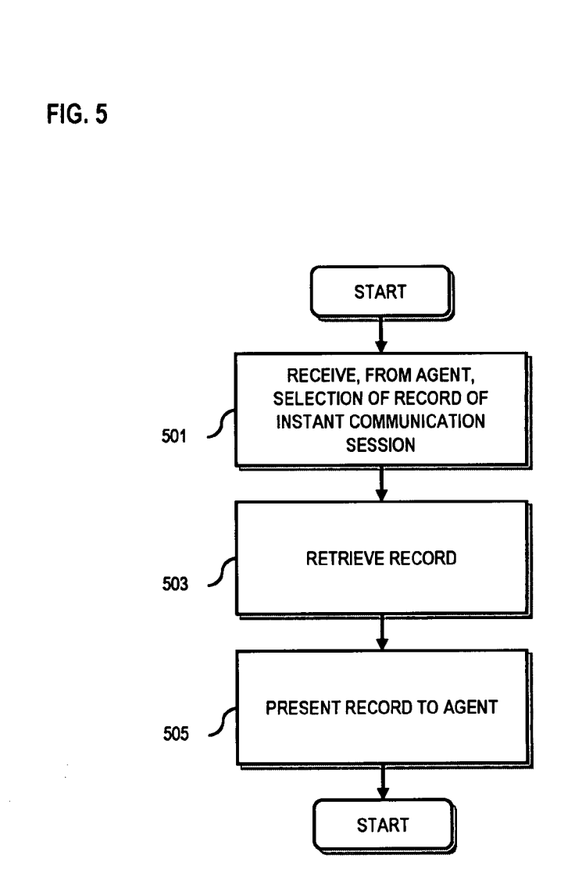
FIG. 5 is a flowchart of a process for presenting a record corresponding to an instant communication (or chat)-based customer support session to a customer support agent, according to an exemplary embodiment.

FIG. 5 is a flowchart of a process for presenting a record corresponding to an instant communication-based customer support session to a customer support agent, according to an exemplary embodiment. For illustrative purposes, the process is described with respect to FIG. 1. It is also noted that the steps of the process may be performed in any suitable order, as well as combined or separated in any suitable manner. At step 501, instant communication module 113 receives, from a customer service agent, a selection of a particular record of a previous instant communication session between a customer and the agent or another agent. In step 503, instant communication module 113 retrieves the selected record from, for instance, service information repository 119 via any suitable querying protocol. Per step 505, the retrieved record is presented (e.g., displayed) to the agent.

As previously mentioned, managed instant communication based customer support services enables customer service agents to multitask or, in other words, concurrently support (or otherwise handle) a plurality of customers requesting customer support.

Figure 6:
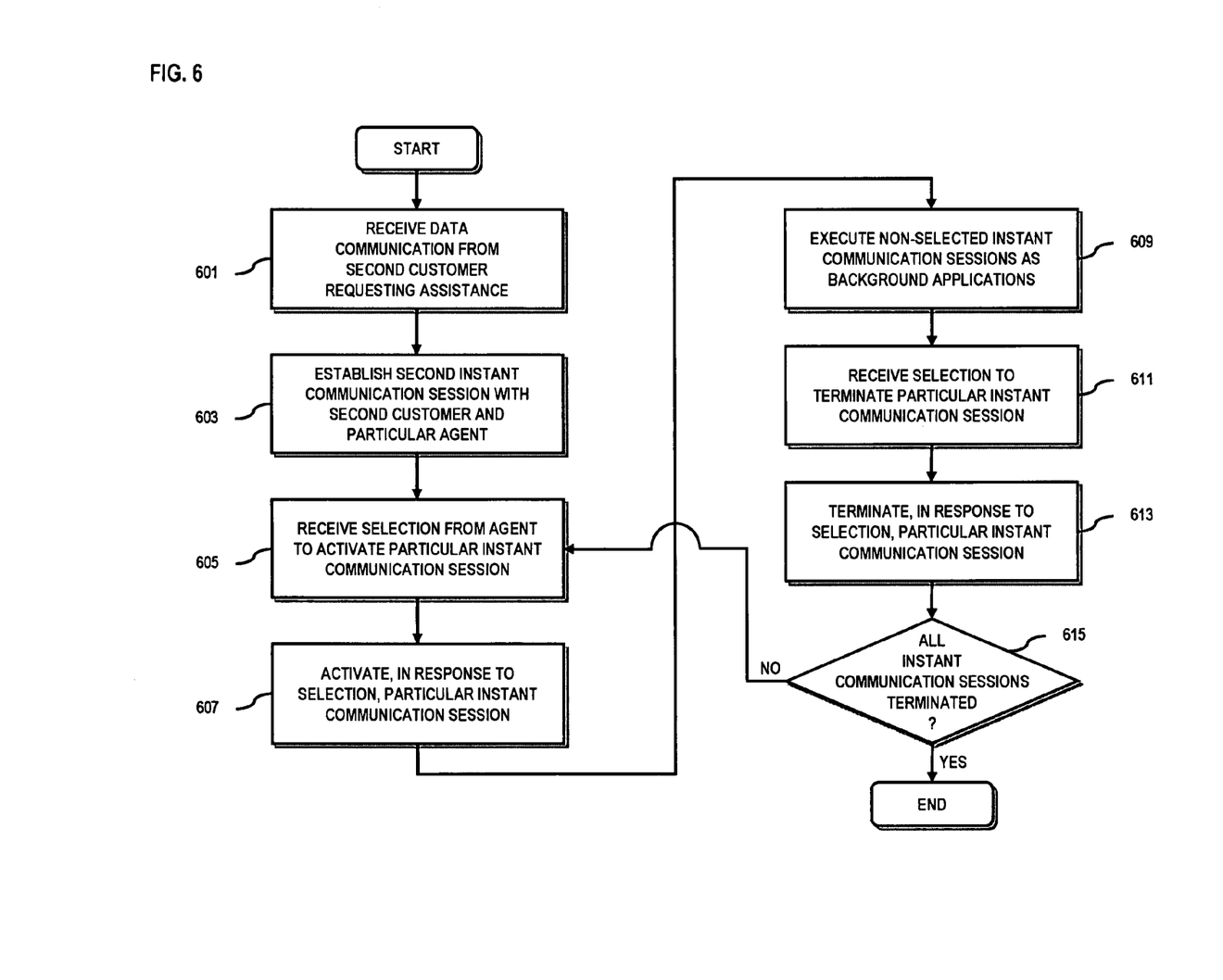
FIG. 6 is a flowchart of a process for concurrently supporting a plurality of instant communication (or chat)-based customer support sessions by a customer support agent, according to an exemplary embodiment.

FIG. 6 is a flowchart of a process for concurrently supporting a plurality of instant communication-based customer support sessions by a customer support agent, according to an exemplary embodiment. It is noted that the steps of the process may be performed in any suitable order, as well as combined or separated in any suitable manner. It is also assumed that at least one (e.g., first) instant communication session has already been established between at least one (e.g., first) customer and a customer service agent. At this point, it is noted that the process is described according to a situation where a customer service agent supports (or otherwise handles) a plurality of instant communication sessions associated with a plurality of customers. It is contemplated; however, that the process is also applicable to situations where a customer engages in a plurality of concurrent instant communication based customer support sessions with a plurality of customer support agents, which may be addressing one or more of the same or different issues of the customer.

As such, in step 601, customer service platform 101 receives, via instant communication module 113, data communication (e.g., text message) from a second customer requesting assistance. At step 603, instant communication module 113 establishes a second instant communication session between the second customer and a particular agent already engaged in at least one other instant communication customer support session with, for instance, a first customer. In certain exemplary embodiments, the second instant communication session may be established with the particular agent based on presence information associated with the plurality of agents. An exemplary graphical user interface (GUI) for concurrently supporting the instant communication sessions is described in more detail in accordance with FIG. 7.

Figure 7:
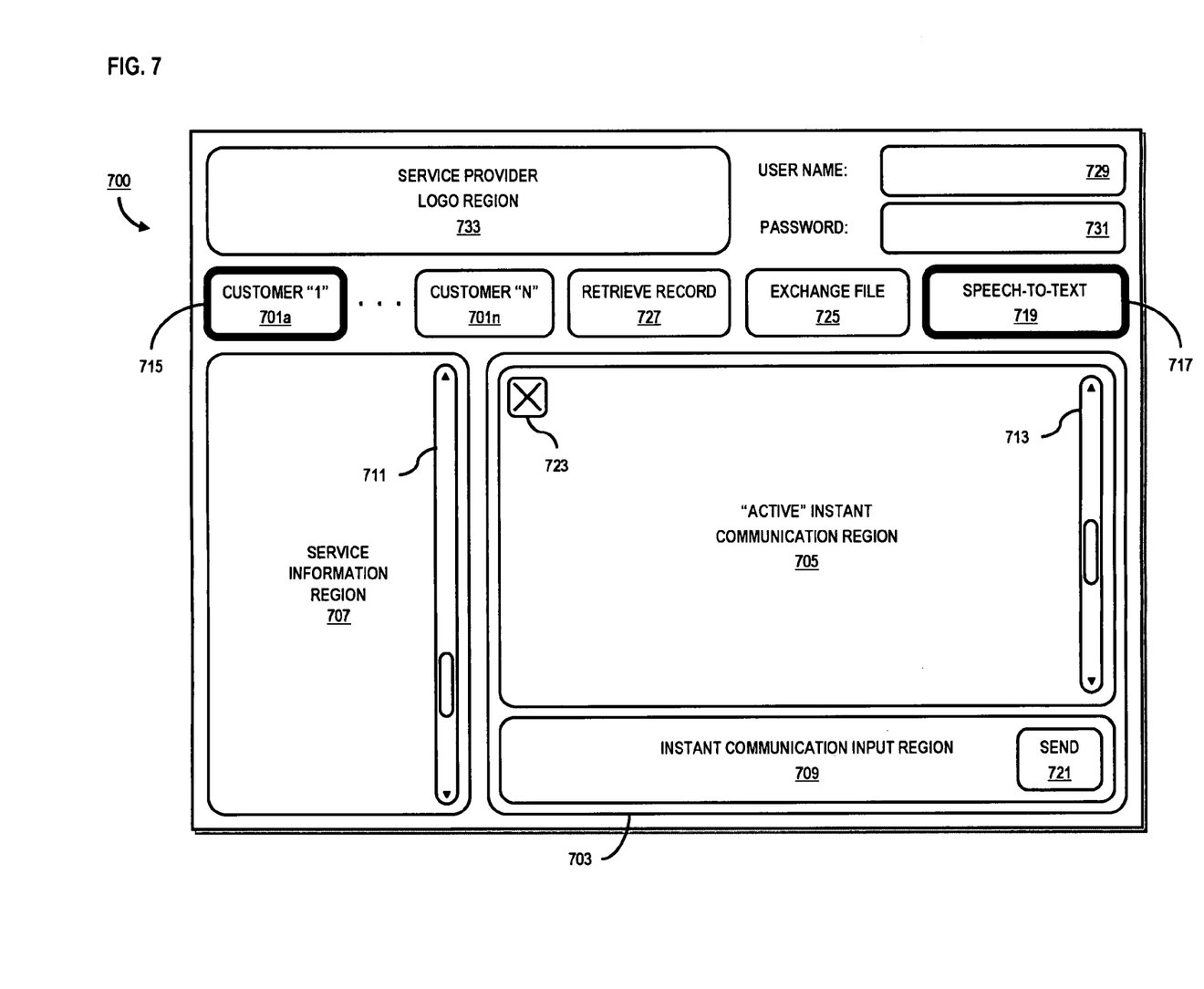
FIG. 7 is a diagram of a graphical user interface for concurrently supporting a plurality of instant communication based customer support sessions, according to an exemplary embodiment.

For explanatory purposes, it is noted that GUI 700 may include one or more "tabs" (or interactive interface elements) 701a-701n for toggling between concurrently supported instant communication sessions. As such, per step 605, instant communication module 113 receives a selection from the agent to activate a particular one of the concurrent instant communication sessions (e.g., selection of a first or a second instant communication session). Based on the received selection, instant communication module 113 activates, in step 607, the selected instant communication session to serve as an "active" instant communication session. According to certain exemplary embodiments, after "activating" a particular instant communication session, any input to GUI 700 will only correspond to input to that particular "active" instant communication session. In this manner, per step 609, non-selected instant communication sessions are executed by instant communication module 113 as background applications. This enables customers to continue corresponding with the agent, as well as enables the agent to multitask during idle periods associated with various ones of the instant communication sessions.

Accordingly, the various instant communication sessions may persist for as long as necessary, but may be terminated upon request of one or more of the participants, such as by selection by the agent to terminate. To this end, instant communication module 113 receives, at step 611, a selection (or any other suitable input) to terminate a particular one of the established instant communication sessions being concurrently engaged in by the agent. Per step 613, instant communication module 113 terminates the particular one of the instant communication sessions based on the received selection. In step 615, instant communication module 113 determines whether all instant communication sessions have been terminated or, in other words, whether any other instant communication based customer support sessions are "still" being engaged in by the agent. If at least two instant communication sessions remain "engaged," the process reverts to step 605, such that the agent may select to activate a particular one of the remaining instant communication sessions. Additionally (or alternatively), instant communication module 113 may automatically select a particular one of the remaining instant communication sessions, which may be based on one or more default settings and/or one or more predefined parameters, which may be correspondingly stored to any suitable storage location of (or available to) system 100. If only one instant communication session remains, then the process may revert to step 607, wherein instant communication module 113 activates the remaining instant communication session as the "active" instant communication session. If, however, all instant communication sessions have been terminated, the process ends.

In order to enable customer service agents (or customers) to effectively and efficiently engage in, e.g., support (or otherwise handle), concurrent instant communication-based customer service sessions, a graphical user interface (GUI) may be provided. It is noted that the GUI may be locally provided by instant communication modules 109a-109n or 111a-111n or may be provided as a networked application provided by, for example, customer service platform 101, such as provided by instant communication module 113.

FIG. 7 is a diagram of a graphical user interface for concurrently supporting a plurality of instant communication based customer support sessions, according to an exemplary embodiment. In this example, it is assumed that GUI 700 is provided for a customer service agent by one or more of instant communication modules 111a-111n or 113. It is also assumed that a plurality of instant communication-based customer service sessions are established between a plurality of customers and the agent. Hence, GUI 700 includes a plurality of "tabs" (or interactive interface elements) 701a-701n corresponding to instant communication sessions respectively associated with a plurality of customers. Selection of (or any other suitable interaction with) a particular tab (e.g., tab 701a) toggles "active" instant communication region 705 between the various concurrently supported instant communication sessions being handled by the agent. That is, selection of, for example, tab 501a toggles "active" instant communication region 705 to present the agent with the correspondence (e.g., textual communications) associated with "CUSTOMER '1'." It may also be the case that interacting with a particular tab causes a service information region 707 to be populated with various service information, e.g., notes, records, preloaded customer service prompts (or responses), customer service help information, etc., corresponding to "CUSTOMER '1'" or simply populated with predetermined service information, e.g., customer service flowcharts, customer service points of reminder, etc., as well as any of the aforementioned information. In other embodiments, service information region 707 may include a navigation tree, an expandable table of contents, or for example FlashMedia presentation of selectable entries, as well as other equivalent listings, menus, options, etc. The content of the respective regions (e.g., regions 705 and 707) may be dynamically updated based on input to instant communication input region 709, corresponding text received within "active" instant communication region 705, information being interacted with within service information region 707, and the like.

Navigational elements/fields, e.g., scrollbars 711 and 713, may be provided and configured to indicate the existence of additional information, entries, fields, etc., not displayed, but navigably available, as well as facilitate interface usability. Accordingly, the customer service agent may browse to this additional information, entries, fields, etc., via, for instance, an input interface of an agent device (e.g., agent device 105a), e.g., a cursor control. One or more fixed focus states (e.g., border 715) and/or distinctive magnification features, e.g., color, brightness, bolding, font type, text size, etc., may be used to convey the "currently active" customer corresponding to the instant communication session set as "active" within "active" instant communication region 705. According to particular embodiments, one or more fixed focus states (e.g., border 717) and/or distinctive magnification features may be used to convey features activated by the customer service agent, such as the customer activating speech-to-text conversion via button (or other suitable interactive interface element) 719. Namely, by interacting with button 719, the customer service agent may request that speech-to-text conversion be activated so that the customer service agent may via, for example, a microphone of (or associated with) agent device 105a provide speech input to GUI 700 that can be converted to text data corresponding to speech input. It is noted that the text data may be presented to the agent via instant communication input region 709 prior to transmission to the customer. As such, the agent may modify the text data presented in instant communication input region 709 via any suitable input, e.g., additional speech input, keyboard input, etc. Once text inputs are "acceptable" to the agent, the agent may interact with button (or any other suitable interactive interface element) 721 to transmit the text data within instant communication input region 709 to the customer associated with "active" instant communication region 705. It is also noted that a button (or any other suitable interactive interface element) 723 may be provided for terminating an instant communication session associated with "active" instant communication region 705. According to certain exemplary embodiments, GUI 700 may also include a tab (or other interactive interface element) 725 for exchanging, e.g., uploading, downloading, etc., data files for transmission over an established instant communication session. Particular other exemplary embodiments of GUI 700 provide for a tab (or other interactive interface element) 727 for retrieving records associated with previous instant communication customer support sessions. It is also contemplated that GUI 700 may be configured to accept verbal commands for user interaction with the respective regions, tabs, buttons, etc.

According to additional exemplary embodiments, GUI 700 may include various other regions, such as a user name region 729 and a password region 731 for enabling customer support agents to "log on" and obtain access to the features and functionalities of GUI 700 and/or service provider platform 101. In alternative embodiments, regions 729 and 731 may be configured to correspond to other associated authentication information. Alternatively (or additionally), a "WEL-COME, USERNAME" message may be presented to authenticated customer service agents. Still further, GUI 700 may include service provider logo region 733 for illustrating (or otherwise presenting) the customer service agent with a logo of the service provider of the managed instant communication based customer support services (or any other suitable business entity), as well as include other suitable (or equivalent) regions, such as an advertisement region (not shown), etc.

The processes described herein for providing managed instant communication based customer support services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
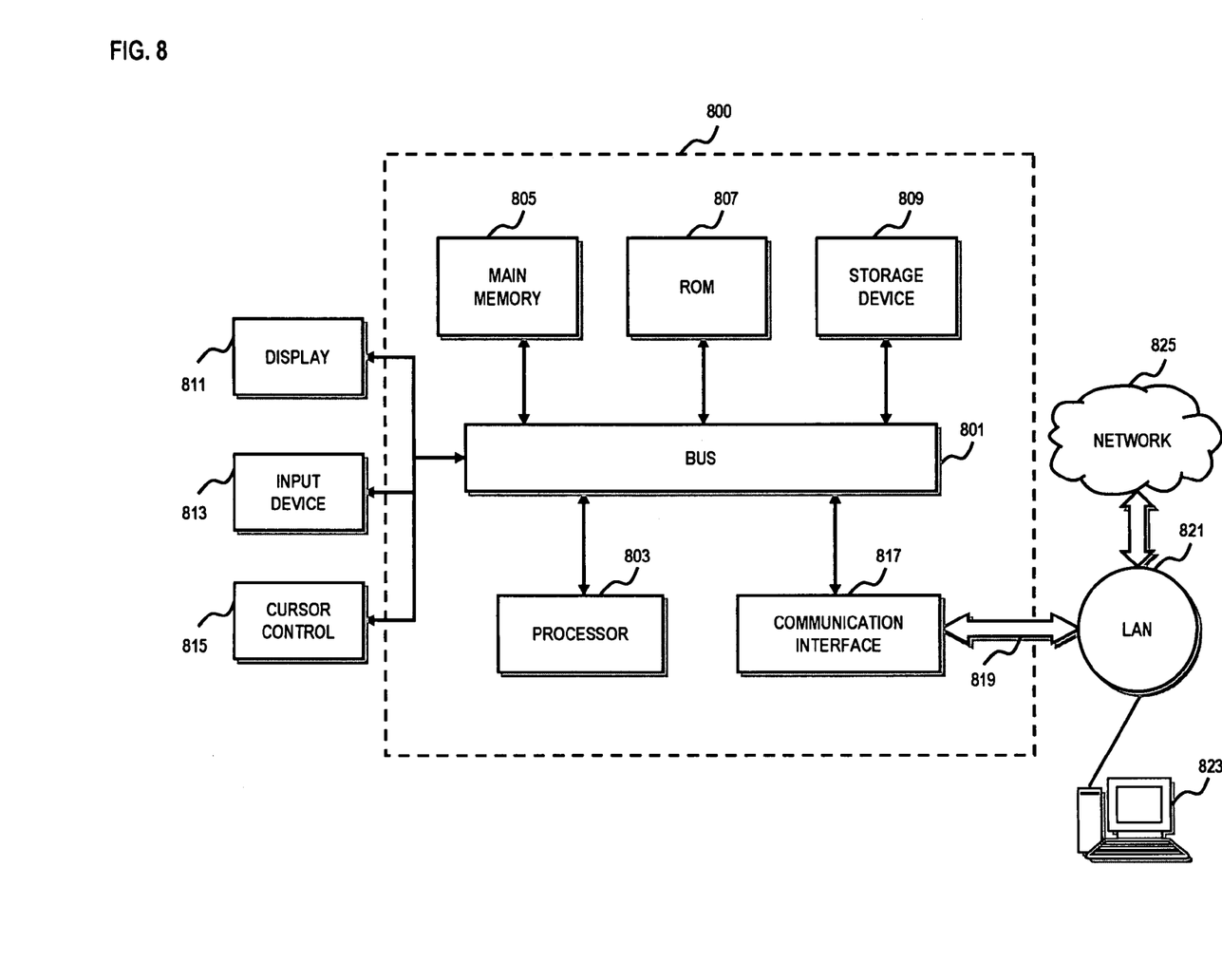
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, at a customer service platform, data communication from a plurality of customers requesting assistance;
   providing presence information and profile information of a plurality of agents to one or more customers of the plurality of customers;
   in response to a request by one of the customers that is provided with the presence information and the profile information, establishing a plurality of instant communication sessions between the one customer and some of the agents at the customer service platform;
   presenting each of the instant communication sessions as a tab within a graphical user interface associated with the one customer;
   activating speech-to-text conversion operation for the one customer and the some agents, wherein the one customer corresponds with the some agents during the instant communication sessions by speech;
   converting speech correspondence during the instant communication sessions to text data; and
   transmitting the text data of the speech correspondence among the one customer and the some agents, wherein the graphical user interface includes an instant communication input region for permitting modification of the text data.

2. A method as recited in claim 1, further comprising:
   displaying the text data of the speech correspondence, in the graphical user interface based on the tabs associated with the instant communication sessions, prior to the transmission; and
   storing a record of data transmitted during the instant communication sessions.

3. A method as recited in claim 1, further comprising:
   attaching a data file to the transmitted correspondence, wherein the data file comprises either image data, audio data, video data, or a combination thereof.

4. A method as recited in claim 1, wherein modification of the text data is based, at least in part, on one or more changes by the one customer prior to transmitting the text data to one or more of the some agents.

5. A method as recited in claim 1, further comprising:
   maintaining a text record of data transmitted during the instant communication sessions; and
   displaying the text record to the one customer.

6. A method as recited in claim 5, wherein the step of displaying comprises:
   selecting a record of an instant communication session by the one customer for viewing the record of the selected instant communication session.

7. An apparatus comprising:
   an interface configured to receive data communication from a plurality of customers requesting assistance; and
   a processor configured to provide presence information and profile information of a plurality of agents to one or more customers of the plurality of customers,
   in response to a request by one of the customers that is provided with the presence information and the profile information, establish a plurality of instant communication sessions between the one customer and some of the agents at the customer service platform,
   present each of the instant communication sessions as a tab within a graphical user interface associated with the one customer,
   activate speech-to-text conversion operation for the one customer and the some agents, wherein the one customer corresponds with the some agents during the instant communication sessions by speech, and
   convert speech correspondence during the one instant communication session to text data,
   wherein the correspondence is transmitted as text data among the one customer and the some agents, and
   wherein the graphical user interface includes an instant communication input region for permitting modification of the text data of the agent speech correspondence.

8. An apparatus as recited in claim 7, wherein the processor is further configured to initiate display of the text data of the speech correspondence, in the graphical user interface based on the tab associated with the instant communication sessions, prior to the transmission, the apparatus further comprising:
   memory configured to store a record of data transmitted during the instant communication sessions.

9. An apparatus as recited in claim 7, wherein the processor is further configured to attach a data file to the transmitted correspondence, wherein the data file comprises either image data, audio data, video data, or a combination thereof.

10. An apparatus as recited in claim 7, wherein modification of the text data is based, at least in part, on one or more changes by the one customer prior to transmitting the text data to one or more of the some agents.

11. An apparatus as recited in claim 7, further comprising:
    a memory configured to store a text record of data transmitted during the instant communication sessions, wherein the processor is further configured to initiate display of the text record to the one customer.

12. An apparatus as recited in claim 11, wherein the processor is further configured to select a record of an instant communication session by the one customer for viewing the record of the selected instant communication session.

13. A system comprising:
    a distribution module configured to route chat session data communication from a customer requesting assistance to a plurality of customer service agents, wherein the chat session data communication is associated with a plurality of chat sessions between the customer and the customer service agents, and the customer is provided with presence information and profile information of the agents for requesting assistance;

a speech recognition module comprising a speech to text data converter configured to convert speech correspondence in the chat sessions into text data, wherein the text data is transmitted via a service portal to the customer and the agents;

a graphical user interface associated with the customer and configured to present each of the chat sessions as a tab therein, wherein the graphical user interface includes an instant communication input region for permitting modification by the customer of the text data of the speech correspondence.

14. A system as recited in claim 13, wherein a view of the text data of the speech correspondence is provided, in the graphical user interface based on the tab associated with the chat session, prior to the transmission.

15. A system as recited in claim 13, further comprising:
storage media configured to store a record of data transmitted during the chat sessions.

16. A system as recited in claim 15, wherein the storage media are further configured to store complete text records of each of the chat sessions, and a view of each of the stored records is provided at the selection of the customer during the chat sessions.

17. A system as recited in claim 13, wherein a data file is attached to a chat session transmission, and the data file comprises either image data, audio data, video data, or a combination thereof.

18. A method as recited in claim 1, wherein the presence information and the profile information specify one or more customer support issues being currently addressed by individual agents, one or more individual agent schedules, one or more individual agent skills, one or more individual agent technological capabilities, one or more individual agent workload, or a combination thereof.

19. A method as recited in claim 1, wherein the one customer addresses at least one identical issue with each of the some agents.

20. A method as recited in claim 1, wherein the one customer addresses different issues with each of the some agents.

* * * * *